United States Patent [19]

Briley

[11] 4,041,247

[45] Aug. 9, 1977

[54] METHOD AND APPARATUS FOR OPERATION OF CARBON MICROPHONES AT LOW AVERAGE CURRENT LEVELS

[75] Inventor: Bruce Edwin Briley, Countryside, Ill.

[73] Assignee: Bell Telephone Laboratories, Incorporated, Murray Hill, N.J.

[21] Appl. No.: 731,693

[22] Filed: Oct. 12, 1976

[51] Int. Cl.$^2$ ............................................. H04R 3/00
[52] U.S. Cl. .................................................. 179/81 R
[58] Field of Search ............................. 179/1 R, 81 R

*Primary Examiner*—George G. Stellar
*Attorney, Agent, or Firm*—James W. Falk

[57] ABSTRACT

A method and circuitry are disclosed which allow the operation of carbon microphones in telephone sets at low levels of average current. The microphone is connected to a pulse-generating circuit which energizes the microphone with pulses of current that effectively sample the incident acoustic signal at a superaudible rate. The level of each current pulse is chosen so that the microphone performs at the high signal-to-noise ratio associated with high current levels and the duty cycle is chosen to match the low average value of available current. The audio signal is recovered by demodulating the resulting PAM (voltage) output signals using a low pass filter. The level of the recovered audio signals is then amplified to the level required by the telephone transmission line. The sampling approach, using the carbon microphone as the sampling element, extends the utility of the carbon microphone to operation at low average current levels which hitherto were unusable because of low signal-to-noise ratio. This method may also permit a uniform reduction in current levels on all the lines of an associated telephone central office thereby reducing total power consumption and allowing the use of higher resistance, fine gauge transmission loops.

17 Claims, 3 Drawing Figures

METHOD AND APPARATUS FOR OPERATION OF CARBON MICROPHONES AT LOW AVERAGE CURRENT LEVELS

BACKGROUND OF THE INVENTION

This invention relates to voice frequency communication systems and, more particularly, to the use of carbon microphones in voice frequency systems that operate at relatively low current levels.

Carbon microphones have heretofore been considered unusable for voice frequency transmission systems operating at low current levels because of unacceptably low signal-to-noise ratios, which low ratios are due to the fact that the gain of the carbon microphone falls off at low current levels while the noise remains substantially unchanged. In pursuit of a low current telephone station capable of operating with below 5 ma of battery current, for example, the major problem is the behavior of the carbon microphone under such conditions. However, the carbon microphone is still highly favored over other types of microphones because of its reliability and low cost. Moreover, continued use of carbon microphones is advantageous in view of their present almost universal use in many communication systems, such as telephone systems, for example.

In some prior art communications circuits, other types of microphones having linear gain characteristics have been substituted for the carbon microphone in low current applications. For example, telephone systems in low density rural areas require customer loops which extend many miles from a central office. The low operating currents encountered at the ends of these long customer loops have previously dictated the design of specialized handsets using electromagnetic transducers as transmitters. These electromagnetic transducer handsets have many drawbacks; a linear transmitter such as the electromagnetic transducer has mechanical as well as economic disadvantages. The same sensitivity which allows operation of the electromagnetic transducer at low current levels also permits pickup and reproduction of low level audio background noise. In contrast, this background noise is normally filtered out by the carbon microphone which is relatively insensitive to low level acoustics.

Other microphone types, such as the electret microphone, for example, have potential low current applications but are still in the experimental stage, and complete commercial feasibility has not yet been demonstrated.

In view of the advantages of carbon microphones as indicated above, and further, in view of the shortcomings of other types of microphones with known low current operating capabilities, the desirability of carbon microphone adapted to operate in a low current environment is evident.

Morevover, the advantages to be gained from operating carbon microphones at low current levels in telephony applications are in no way restricted to long customer loop applications. Instead, for example, the universal operation of carbon microphone telephone handsets at reduced current levels, irrespective of loop lengths, could result in significant energy conservation. The electrical current requirements of the telephone handset carbon microphone needed to ensure good transmission quality are determining factors in power consumption, line voltage and transmission cable resistance. Accordingly, operation of the telephone handset at a uniform low current level on all lines of a telephone office would reduce total power consumption, cut backup battery requirements and allow fine gauge higher resistance loop cables.

One object of the invention, therefore, is to adapt a carbon microphone for effective operation under conditions of low power.

Another object is to combine the advantages of a carbon microphone with certain advantages of an electromagnetic microphone.

A related object is to reduce the power consumption of a telephone network.

SUMMARY OF THE INVENTION

The foregoing and other objects are achieved in accordance with the principles of the present invention in one illustrative embodiment thereof wherein low duty cycle current pulses are generated and applied to the carbon microphone at a frequency at least twice the highest frequency to which the microphone responds. The magnitude of the current pulses is sufficient to operate the microphone in its high signal-to-noise region, but due to the low duty cycle the average current carried by the current pulses is much lower than the average current required with a continuous current bias. Recovery of the audio signals from the pulse amplitude modulated waveform developed by the microphone in response to the current pulses is advantageously carried out in accordance with Nyquist sampling techniques.

According to one feature of the present invention, the current pulses which are applied to the microphone are generated by a constant current source controlled by an oscillator.

According to another feature, recovery of the audio signals from the pulse amplitude modulated waveform is carried out by circuitry comprising a low-pass filter which integrates the waveform and an amplifier which amplifies the resulting signal.

According to one aspect of the present invention, apparatus is provided to control a carbon microphone in a telephone set in order to reduce the microphone current requirements and allow the set to operate on central office battery potential over a long telephone line while still retaining satisfactory microphone performance. The apparatus comprises a constant current source connected to the microphone to control current flow therethrough, an oscillator to turn the source on and off, producing the low duty cycle current pulses through the microphone in accordance with the invention, and a low-pass filter and amplifier arrangement for recovering the audio information from the pulsed voltage waveform produced by the microphone.

According to another aspect of the present invention, circuitry is further included to couple the amplified audio information back into the telephone set and the telephone line.

According to yet another aspect of the invention, circuitry is provided to increase the central office battery potential appearing at the telephone set to provide sufficient voltage to operate the microphone without voltage cutoff on very long telephone line loops.

According to another feature of the present invention, the oscillator which drives the constant current source is an astable multivibrator. The constant current source is a transistor having its base connected to the oscillator output and its emitter connected through a resistor to ground and its collector connected to the microphone so that a pulsed constant current is drawn through the microphone by the transistor. The low-pass filter is an RC filter for integrating the pulsed waveform; and a feedback amplifier, driving a transformer, is used to couple analog signals back into the telephone set.

DETAILED DESCRIPTION

Figure 1:
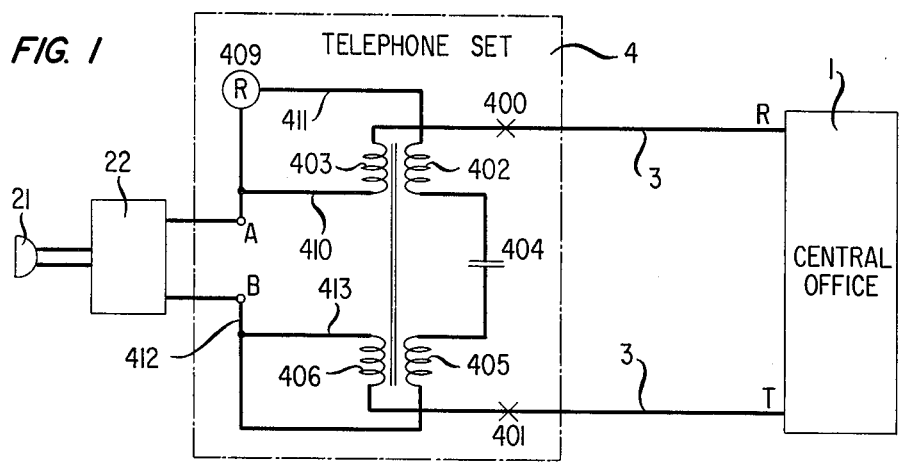
FIG. 1 shows the circuitry of an ordinary telephone set in which is incorporated the microphone control circuitry of this invention.

Referring to FIG. 1, in a normal telephone arrangement, a telephone set 4 is connected by a telephone line 3 to a central office 1 which supplies battery potential to conductors T and R of line 3. Typically, conductor T is grounded and negative battery (negative 48 volts) is applied to conductor R to operate the transmitting and receiving elements of set 4. Telephone set 4 and the circuitry included therein are well known to those skilled in the art; and, accordingly, the circuitry shown in FIG. 1 inside telephone set 4 has been greatly simplified so that only that portion is depicted which is necessary for an understanding of the present invention.

Telephone set 4 is connected to line 3 by means of switchhook contacts 400 and 401 in a well-known manner when the telephone handset (not shown) is lifted from its cradle. Thus, battery and ground appearing on line 3 are applied via the hybrid transformer consisting of coils 402, 403, 405 and 406 to transmitter 21 and receiver 409, ignoring for the moment the microphone control circuit 22 of my invention. In particular, ground potential in central office 1 is applied via conductor T, contact 401, coil 406 and leads 413 and 412 to terminal B of transmitter 21. Similarly, terminal A of transmitter 21 is connected to negative battery at the central office by lead 410, coil 403, contact 400 and conductor R of line 3.

In most telephone sets, transmitter 21 is a carbon microphone which electrically appears as a varying resistance through which current flows over the loop including microphone 21 and conductors T and R of line 3. This current flow may be used to operate a line relay in office 1 for signaling purposes, as when switchhook contacts 400 and 401 are closed. In conventional usage, sound waves impinging on microphone 21 modulate the current flowing therethrough to create electrical analog signals corresponding to the voice information. Receiver 409 is also connected across line 3 by means of leads 411 and 410, and coils 403, 402, 405, and 406. However, capacitor 404 prevents any direct current flow through receiver 409.

Although conductors T and R of line 3 are normally made of a good electrical conductor, typically copper, they still have an electrical resistance which depends on their length. This resistance is effectively in series with microphone 21 (and a resistor, not shown, in series with microphone 21, which in standard telephone sets controls current flow through microphone 21) in the central office current loop. The effective series resistance of line 3 limits the maximum current that may flow through the loop. In most telephone installations, telephone set 4 would be located close enough to central office 1 so that sufficient current flows through the central office loop to operate microphone 21 in its high signal-to-noise range. However, as the distance between office 1 and telephone set 4 increases, the current, limited by the increasing resistance of line 3, decreases. At some point the available current is insufficient to operate microphone 21 with a satisfactory signal-to-noise ratio. In these situations, a carbon microphone normally cannot be used in set 4.

Advantageously, according to the principles of this invention, the microphone 21 can be utilized with circuitry disclosed herein to enable operation at an extremely low level of available current. Specifically, the microphone control circuit 22 is connected between the microphone 21 and the terminals A and B; and the current-limiting series resistor, not shown, is eliminated. According to the invention, the illustrative circuitry utilizes an ordinary carbon microphone and control circuitry 22 to reduce the current requirements of microphone 21 to the low level that may be available. Circuitry 22 is shown in more detail in FIG. 2.

Figure 2:
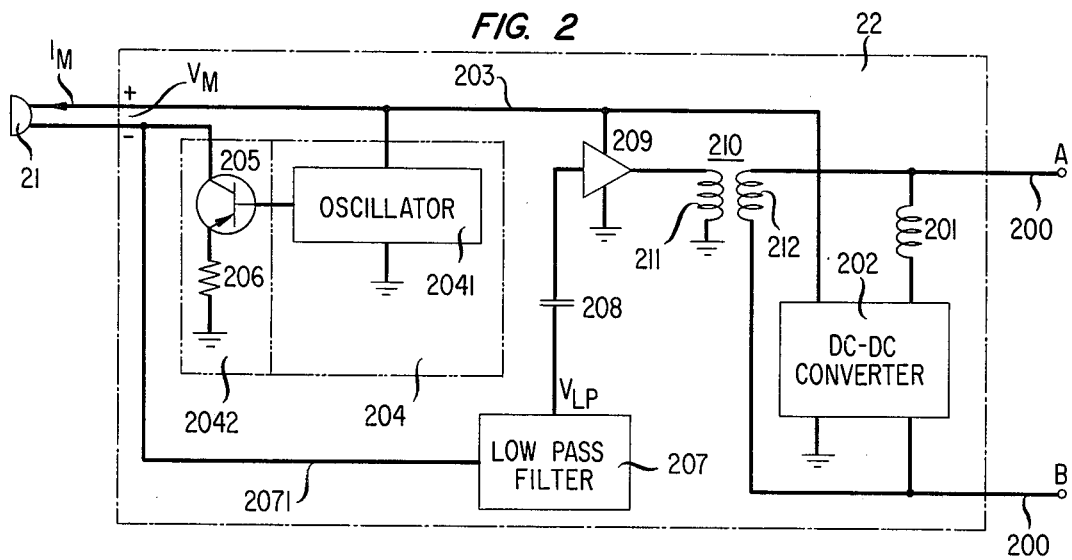
FIG. 2 is a schematic block diagram of one specific illustrative embodiment of the inventive microphone control circuitry.

Turning now to FIG. 2, the inventive circuitry which controllably energizes carbon microphone 21 is shown in block schematic form. Contrary to the normal operation of microphone 21 with a continuous direct current bias, the current through microphone 21 is controlled by pulse source 204 comprised of oscillator 2041 and pulser 2042. The current flowing throuh microphone 21 is pulsed by source 204 instead of being continuous so that the amplitude of the current pulses are high enough to operate microphone 21 in its high signal-to-noise range. However, the duration of the pulses is short enough so that the average current flowing through microphone 21 does not exceed the average value of the current available over line 3. This average value is, of course, lower than the steady current otherwise required for proper operation. Audio signals which modulate the pulsed waveform produced by microphone 21 are recovered and reproduced as a current waveform by means of low-pass filter 207, amplifier 209, and transformer 210, as will hereafter be described.

In cases where the resistance of line 3 is very high, the average current of the pulsed current waveform may reduce the voltage available at the telephone set to such a level that an insufficient voltage swing is available to microphone 21 to provide for operation without cutoff. In these cases, operation of the inventive circuitry involves increasing the voltage available to the microphone 21 at points A and B (which results, as previously described, from the application of central office battery and ground to telephone set 4) by means of DC-to-DC converter 202 to such a level as will provide a sufficient voltage swing for microphone 21 for satisfactory performance.

Specifically, the line voltage presented to the telephone set and appearing across terminals A and B is applied by leads 200 to DC-to-DC converter 202 through inductor 201, which inductor serves to filter out any AC components and to present a high AC impedance towards leads 200. DC-to-DC converter 202, as previously explained, is necessary to produce a sufficiently high voltage (approximately 5 volts) across microphone 21 so that microphone 21 can operate without cutoff. Converters, such as converter 202, are well known in the art and will not be described further herein. An example of a converter circuit which consists of a high-speed square wave oscillator, transformer, and filter arrangement is disclosed, along with design equations, in *Design of Solid State Power Supplies,* Eugene R. Hnatek, Van Nostrand Reinhold, 1971, page 35. Such a circuit provides a step-up in voltage at reduced average current levels, which step-up is necessary if the circuitry is to operate on a long central office loop.

Converter 202 may not be necessary in all cases. It is required only in those cases where because of very high line resistance even a small amount of current flow would reduce the voltage at the station set below the level which is necessary to produce the required voltage range at the microphone. In many cases, the inventive circuitry will reduce the current requirements of the microphone so that adequate voltage will be available at the telephone set even in the absence of a converter. For example, in cases where the inventive circuitry is being used to reduce the power requirements of the telephone set, sufficient voltage may be available to operate microphone 21 without cutoff. Although a voltage converter is not strictly necessary in these cases, it may be necessary to utilize a charge storage device across line 203 and ground. This is because inductor 201, which isolates converter 202 from audio signals, also limits the peak current flow during the current pulses. In these cases, converter 202 may take the form of a simple shunt capacitor to provide the proper peak current necessary to operate microphone 21 during the on-cycle of the pulsed current waveform.

Converter 202 places an output voltage on lead 203, which voltage is used to operate microphone 21, oscillator 2041 and amplifier 209. If microphone 21 were connected directly across converter 202, and unlimited current were available, then, in the presence of an audio signal the microphone current ($I_m$) would appear as in FIG. 3 (with average value $I_{AV}$) and the microphone would operate in the high signal-to-noise region. In some situations only a lower average current may be available ($I_{AVAIL}$ in FIG. 3) in operation of the microphone in the low signal-to-noise region. However, in accordance with the invention, the microphone current, $I_M$, is not continuous but is controlled by a pulse source 204 consisting of oscillator 2041 and pulser 2042. Pulser 2042 acts as a constant current source, which is turned on and off by oscillator 2041. In particular, the base of transistor 205 is controlled by the voltage output waveform of oscillator 2041. Oscillator 2041 is a square wave oscillator which produces pulses with a low duty cycle (10–20 percent). The frequency of the pulses must be at least twice the highest frequency responded to by microphone 21 so that audio information may be recovered from the microphone waveform, as will be hereafter descibed. It is also advantageous if the frequency is superaudible (approximately 20,000 Hz). A superaudible frequency prevents the fundamental sampling frequency or any harmonics thereof from being heard over the telephone. Oscillator circuitry which is capable of generating such pulses is well known. For example, an astable multivibrator suitable for use with the embodiment, together with design equations, is disclosed in *Pulse, Digital and Switching Waveforms,* Millman and Taub, McGraw Hill Book Co., 1965, page 441.

The pulses produced by oscillator 2041 are applied to transistor 205 resulting in voltage pulses appearing across resistor 206 thereby causing constant current pulses to be drawn through transistor 205 and microphone 21. Thus, the microphone current, according to the invention, would be as shown as current $I_{MP}$ in FIG. 3. A simple analysis shows that the average value of the current of waveform $I_{MP}$ is much less than in the average value ($I_{AV}$) of the current in waveform $I_M$. The average value of the current of waveform $I_{MP}$ may, of course, be changed by varying the duty cycle until the average current is equal or less than the current available to the telephone set over leads 200 ($I_{AVAIL}$ in FIG. 3).

Figure 3:
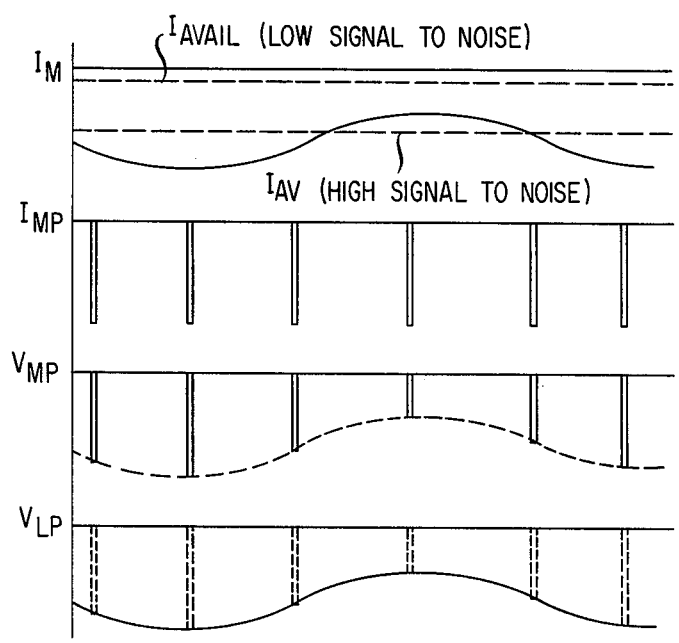
FIG. 3 shows illustrative current and voltage waveforms at selected points in the microphone control circuitry of FIG. 2.

In the absence of an incoming audio signal, the voltage $V_M$ across microphone 21 would, of course, be proportional to the current $I_{MP}$. However, when an audio signal is applied to microphone 21, a pulsed voltage waveform is produced with amplitudes modulated by the audio signal, as shown in FIG. 3, as voltage $V_{MP}$. The voltage $V_{MP}$ is applied via lead 2071 to low-pass filter 207 in order to recover the audio signal. According to the well-known Nyquist sampling theorem, in a band-limited system, signals may be sampled at twice the highest frequency in the system, and the original information recovered, with no loss, by low-pass filtering. Since the microphone itself provides an effective frequency band limiter, if the current pulse samples are of a frequency at least twice the highest frequency responded to by the microphone, all the audio information may be recovered by low-pass filter 207 which advantageously may be comprised of resistance and capacitance elements. Filter 207 integrates the pulse amplitude modulated voltage waveform to produce an output equivalent to the audio signal impinging on microphone 21. Such a signal is shown as $V_{LP}$ in FIG. 3. This signal is applied via capacitor 208 (which removes the DC component) to amplifier 209. Amplifier 209 is an efficient amplifier (such as an operational amplifier with a feedback configuration) which amplifier amplifies the recovered audio signals and applies the amplified signals to primary winding 211 of transformer 210. Transformer 201 converts the varying voltage signals into current signals which are electrically coupled to secondary winding 212. The signals are then applied to leads 200 and terminals A and B and from thence to the telephone set and central office.

What is claimed is:

1. Apparatus for controllably energizing a carbon microphone comprising
   means for receiving a steady current having an average value in the low signal-to-noise region of the operating characteristic of said microphone, and
   means of converting said current received by said receiving means into a series of pulses for energizing said microphone, said pulses having said same average value but having a peak value in the high signal-to-noise region of the operating characteristic of said microphone.

2. Apparatus for controllably energizing a carbon microphone according to claim 1 wherein said converting means comprises
   a switchable constant current source, and
   means for switching said source on and off to generate said pulses.

3. Apparatus for controllably energizing a carbon microphone according to claim 1 wherein said microphone receives audio information and said apparatus further comprises means for integrating the voltage developed across said microphone in response to said current pulses to recover said audio information.

4. Apparatus for controlling a carbon microphone for receiving audio signals to reduce microphone current requirements for high signal-to-noise ratio performance comprising
- means for generating low duty cycle constant current pulses for frequency at least twice the highest frequency responded to by said microphone,
- means for applying said pulses to said microphone to sample said audio signals whereby the voltage across said microphone is a pulsed waveform modulated by said audio signals and the average value of the current applied to said microphone is less than the steady current value required for high signal-to-noise ratio performance, and
- means for recovering said audio signals from said waveform.

5. Apparatus for controlling a carbon microphone according to claim 4 wherein said generating means comprises
- a constant current source controllable to generate a constant continuous current, and
- an oscillator for turning said source on and off to produce said pulses.

6. Apparatus for controlling a carbon microphone according to claim 5 wherein said applying means comprises
- means for connecting said microphone to said source.

7. Apparatus for controlling a carbon microphone according to claim 4 wherein said recovering means comprises
- a low-pass filter responsive to said pulsed waveform for integrating said waveform to produce an electrical analog signal of said audio signal.

8. Apparatus for controlling a carbon microphone according to claim 7 wherein said recovering means further comprises an amplifier responsive to said electrical analog signal for amplifying said analog signal.

9. A method for controlling a carbon microphone which receives audio signals to reduce microphone current requirements for high signal-to-noise ratio performance comprising the steps of:
1. Generating low duty cycle constant current pulses of frequency at least twice the highest frequency responded to by said microphone;
2. Applying said pulses to said microphone to sample said audio signals whereby the voltage across said microphone is a pulsed waveform modulated by said audio signals and the average value of the current applied to said microphone is less than the steady current value required for high signal-to-noise ratio performance; and
3. Recovering said audio signals from said waveform.

10. Apparatus for controlling a carbon microphone in a telephone set for reducing microphone current requirements to allow said set to operate on central office battery potential over a long telephone line, while retaining satisfactory microphone performance, said apparatus comprising
- a constant current source connected to said microphone for controlling the currennt therethrough,
- an oscillator for turning said source on and off to produce low duty cycle current pulses through said microphone at a frequency at least twice the highest frequency responded to by said microphone, whereby the voltage across said microphone is a pulsed waveform modulated by audio signals incoming to said telephone set,
- a low-pass filter responsive to said pulsed waveform for integrating said waveform to produce an electrical analog signal of said audio signals, and
- an amplifier responsive to said analog signals for amplifying said analog signals.

11. Apparatus for controlling a carbon microphone according to claim 10 further comprising
- means responsive to said amplified analog signal for coupling said analog signal into said set and onto said line.

12. Apparatus for controlling a carbon microphone according to claim 10 further comprising
- means for increasing central office battery potential appearing at said set to provide sufficient voltage to operate said microphone without voltage cutoff.

13. Apparatus for controlling a carbon microphone according to claim 10 further comprising
- means connected between said low-pass filter and said amplifier for eliminating direct current components in said analog signal.

14. Apparatus for controlling a carbon microphone in a telephone set for reducing microphone current requirements to allow said set to operate on central office battery potential over a long telephone line, while retaining satisfactory microphone performance, said apparatus comprising
- an astable multivibrator having an output for producing a voltage waveform of low duty cycle pulses at a frequency at least twice the highest frequency responded to by said microphone,
- a transistor having a base connected to said oscillator output, an emitter connected through a resistor to ground and a collector connected to said microphone so that said transistor acts as a constant current cource controlled by said oscillator for applying current pulses to said microphone, whereby the voltage across said microphone is a pulsed waveform modulated by audio signals incoming to said telephone set,
- an RC low-pass filter having an input connected to said transistor collector and an output for integrating said pulsed waveform to produce an electrical analog signal of said audio signals, and
- a feedback amplifier having an input and an output and being responsive to said analog signals for amplifying said analog signals.

15. Apparatus for controlling a carbon microphone according to claim 14 further comprising
- a transformer connected to said amplifier output and to said telephone set for coupling said analog signal into said set and onto said line.

16. Apparatus for controlling a carbon microphone according to claim 14 further comprising
- A DC-to-DC converter connected to said telephone set responsive to central office battery potential appearing at said set for providing an increased voltage potential to operate said microphone without voltage cutoff and to power said oscillator and said amplifier.

17. Apparatus for controlling a carbon microphone according to claim 14 further comprising
- a capacitor connected between said low-pass filter output and said amplifier input for eliminating direct current components in said analog signal.

* * * * *